United States Patent

Gunschera et al.

[19]

[11] Patent Number: 6,142,468

[45] Date of Patent: Nov. 7, 2000

[54] CHAIN CONVEYOR FOR TRANSPORTING SHEETS IN A PRINTING PRESS

[75] Inventors: Frank Gunschera, Nussloch; Roland Hirth, Römerberg, both of Germany

[73] Assignee: Heidelberger Druckmaschinen Aktiengesellschaft, Heidelberg, Germany

[21] Appl. No.: 09/275,379

[22] Filed: Mar. 24, 1999

[30] Foreign Application Priority Data

Mar. 24, 1998 [DE] Germany ................. 298 05 277 U

[51] Int. Cl.⁷ ............... B65H 5/04; B65H 29/04; B65G 12/00; B65G 15/60
[52] U.S. Cl. ................ 271/277; 271/204; 198/837; 198/841
[58] Field of Search ........................... 271/204, 277, 271/264; 198/803.3, 803.4, 803.5, 803.6, 803.7, 803.8, 803.9, 803.1, 851, 644, 837, 841

[56] References Cited

U.S. PATENT DOCUMENTS

| | | | |
|---|---|---|---|
| 3,726,389 | 4/1973 | Klein et al. | 198/179 X |
| 3,862,681 | 1/1975 | Barker | 198/50 X |
| 4,718,543 | 1/1988 | Leisner et al. | . |
| 4,729,471 | 3/1988 | Tüns et al. | . |

*Primary Examiner*—Christopher P. Ellis
*Assistant Examiner*—Kenneth W Bower
*Attorney, Agent, or Firm*—Herbert L. Lerner; Laurence A. Greenberg; Werner H. Stemer

[57] ABSTRACT

A chain conveyor for transporting sheets in a sheet-processing printing press, having chain guide rails which, together with a holder for carrying the guide rails, define an interior having an open long side, and having conveyor chains carrying gripper systems for gripping the sheets. The conveyor chains being guidable by the chain guide rails, being formed by outer tabs and inner tabs joined together swivellably with respect to pivot axes and, on a side thereof, having cover tabs for covering the open long side, includes detent elements on the cover tabs for connecting the cover tabs form-lockingly to a respective outer tab; and a sheet-fed printing press having the foregoing chain conveyor.

4 Claims, 4 Drawing Sheets

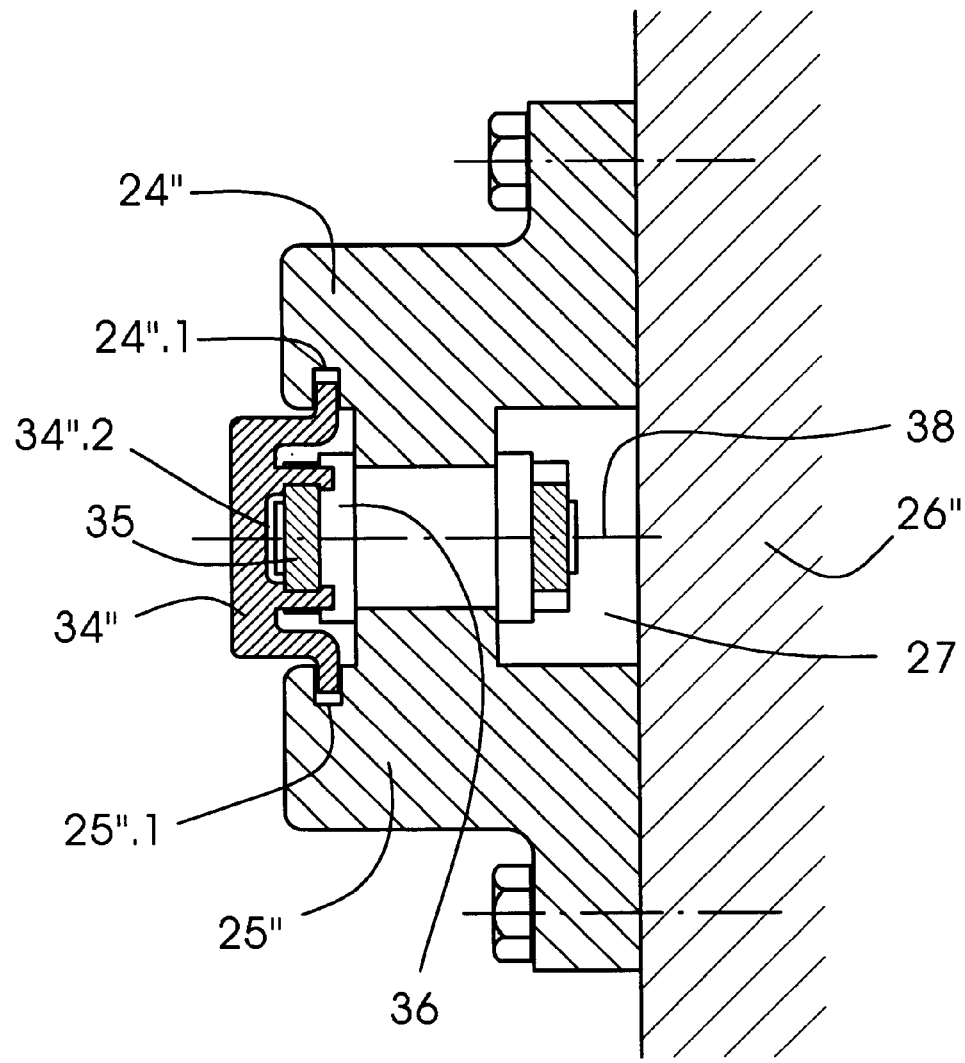

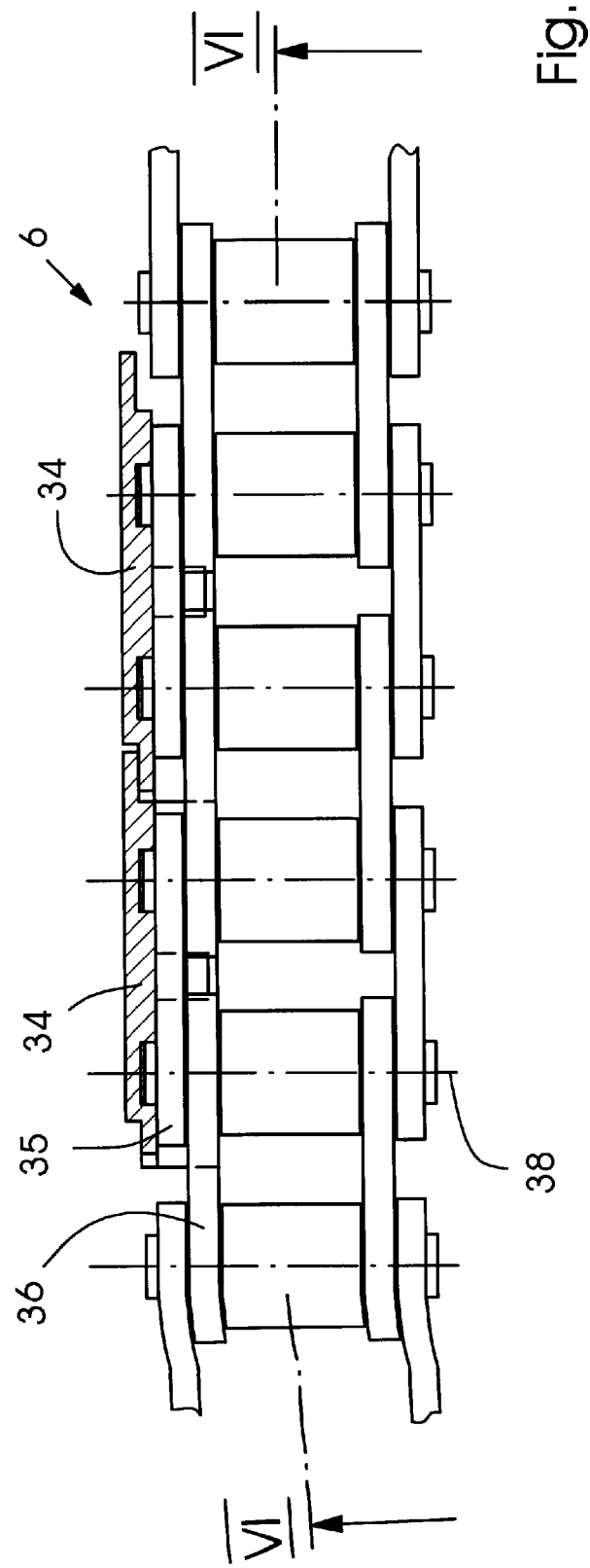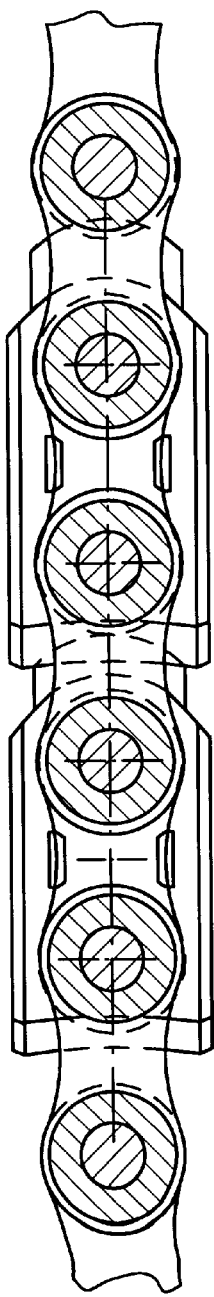

CHAIN CONVEYOR FOR TRANSPORTING SHEETS IN A PRINTING PRESS

BACKGROUND OF THE INVENTION

Field of the Invention

The invention relates to a chain conveyor for transporting sheets in a sheet-processing printing press, having chain guide rails which, together with a holder for carrying the guide rails, define an interior having an open long side, and having conveyor chains carrying gripper systems for gripping the sheets, the conveyor chains being guidable by the chain guide rails, being formed by outer tabs and inner tabs joined together swivellably with respect to articulating axes and, on a side thereof, having cover tabs for covering the open long side; as well as a sheet-fed printing press equipped with the chain conveyor.

A chain conveyor of the foregoing general type has become known heretofore from the German Patent 22 46 061. The cover tabs provided therefor are supposed to encapsulate the interior so that it is dustproof and lubricant-proof. The conveyor chain used in this regard is formed by outer tabs and inner tabs swivellably joined together with respect to articulating or pivot axes, and the pivot axes are formed by chain bolts, which are partly in the form of a standard version that is typical in roller chains and partly in the form of a special version. A respective chain bolt made in a special version is lengthened on one side of the chain conveyor. The lengthened portion of the chain bolt carries a bearing bushing and a compression spring, that is braced against the free end of the lengthened portion and presses the bearing bushing in a direction towards the end of the chain bolt distal from the lengthened portion. Each cover tab has two bores, which have a mutual spacing corresponding to multiple divisions of the chain conveyor. Each bearing bushing passes through one of these bores in successive cover tabs and, under the influence of the aforementioned compression spring, each bearing bushing presses against a respective cover tab by a collar formed on the bearing bushing, and presses the cover tab against slide rails mounted on the chain guide rails.

The lengthened chain bolts are disposed at a spacing equivalent to the spacing of the bores, a spacing which extends over multiple divisions of the conveyor chain, and chain bolts of the aforementioned standard type are provided between the lengthened chain bolts.

The heretofore known chain conveyor thus requires a conveyor chain that has been individualized in various respects, not only with regard to how the gripper systems are secured but also as to how the cover tabs are attached.

SUMMARY OF THE INVENTION

It is accordingly an object of the invention to provide a chain conveyor for transporting sheets in a printing press as defined at the introduction hereto of such construction that cover tabs can be attached to the conveyor chain without requiring that the conveyor chain be embodied in any special manner.

With the foregoing and other objects in view, there is provided, in accordance with one aspect of the invention, a chain conveyor for transporting sheets in a sheet-processing printing press, having chain guide rails which, together with a holder for carrying the guide rails, define an interior having an open long side, and having conveyor chains carrying gripper systems for gripping the sheets, the conveyor chains being guidable by the chain guide rails, being formed by outer tabs and inner tabs joined together swivellably with respect to pivot axes and, on a side thereof, having cover tabs for covering the open long side, comprising detent elements on the cover tabs for connecting the cover tabs form-lockingly to a respective outer tab.

In accordance with another feature of the invention, the detent elements engage behind the respective outer tab in the region of the narrowest cross section thereof.

In accordance with a further feature of the invention, a respective cover tab, on a side thereof facing towards a respective outer tab, is formed with indentations which are concentric to the respective pivot axis.

In accordance with a concomitant aspect of the invention, there is provided a sheet-fed printing press having a chain conveyor for transporting sheets, the chain conveyor having chain guide rails which, together with a holder for carrying the guide rails, define an interior having an open long side, and having conveyor chains carrying gripper systems for gripping the sheets, the conveyor chains being guidable by the chain guide rails, being formed by outer tabs and inner tabs joined together swivellably with respect to pivot axes and, on a side thereof, having cover tabs for covering the open long side, comprising detent elements on the cover tabs for connecting the cover tabs form-lockingly to a respective outer tab. In this regard, it is noted that a form-locking connection is one which connects two elements together due to the shape of the elements themselves, as opposed to a force-locking connection, which locks the elements together by force external to the elements.

Thus, an objective of the invention is attained by providing the cover tabs with detent elements by which the cover tabs can be connected in a form-locking manner with a respective outer tab.

Such an embodiment has the further advantage that by embodying each cover tab and the detent elements provided thereon in one piece, for example, in the form of a plastic injection-molded part, no additional parts are needed in order to connect the cover tabs to the conveyor chain.

Other features which are considered as characteristic for the invention are set forth in the appended claims.

Although the invention is illustrated and described herein as embodied in a chain conveyor for transporting sheets in a printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

BRIEF DESCRIPTION OF THE DRAWINGS

FIG. 4 is a view like those of FIGS. 2 and 3, with another different exemplary embodiment of the cover tabs;

FIG. 5 is a plan view of a length of a conveyor chain provided with the cover tabs which are shown in a sectional view taken along the chain bolt axes; and FIG. 6 is a longitudinal sectional view of FIG. 5 taken along the line VI—VI in the direction of the arrows.

DESCRIPTION OF THE PREFERRED EMBODIMENTS

Figure 1:
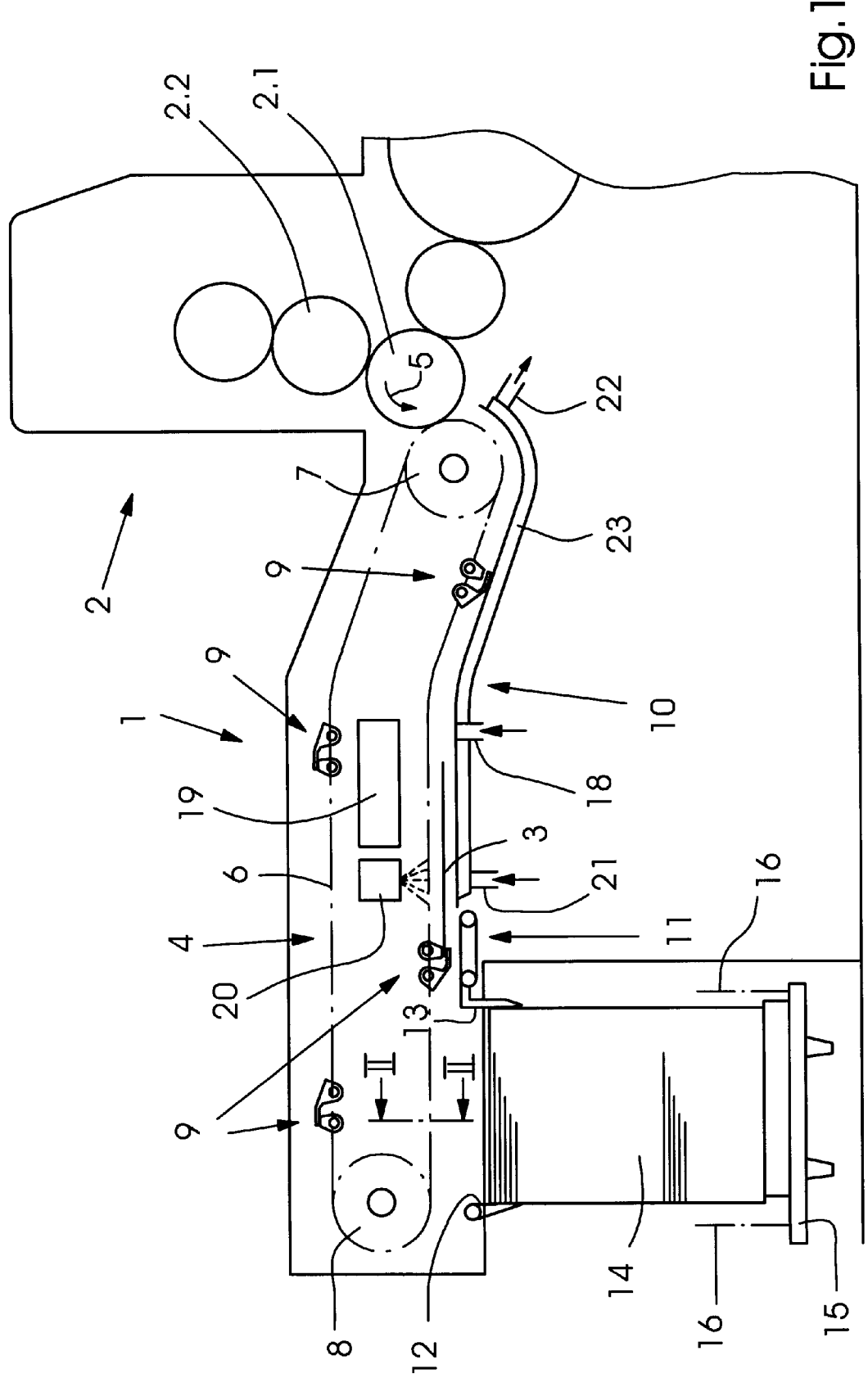
FIG. 1 is a fragmentary, diagrammatic side elevational view of a chain delivery of a printing press for processing sheets, for example, wherein a chain conveyor for transporting sheets is provided.

In principle, a chain conveyor can be used wherever, in a sheet-fed printing press, the sheets are not transported by drums or cylinders. However, the use of a chain conveyor proves to be especially advantageous where the atmosphere in a printing press has an especially high concentration of floating or suspended substances. Referring now to the drawings and, first, particularly to FIG. 1 thereof, there is shown therein a chain conveyor in a chain delivery system 1 of a sheet-fed printing press, which will therefore serve as a base for the invention, by way of example hereinbelow. The chain delivery system 1 follows a final processing station of the printing press. Such a processing station may be a printing unit or a post-treatment unit, such as a coating or varnishing unit. In the example at hand, the last processing station is a printing unit 2, operating by the offset method, with an impression cylinder 2.1. The impression cylinder 2.1 carries a respective sheet in a processing direction represented by the arrow 5 indicating the direction of rotation through a printing nip between the impression cylinder 2.1 and a rubber blanket cylinder 2.2 cooperating therewith, and finally transfers the sheet to the chain conveyor 4 by opening grippers disposed on the impression cylinder 2.1 for gripping the sheet 3 at a gripper edge on a leading end of the sheet. The chain conveyor 4 includes two actuators 6, each formed by one conveyor chain 6'. A given conveyor chain 6' revolves in operation along a respective side wall of the chain delivery system 1 and wraps around a respective one of two synchronously driven drive chain or sprocket wheels 7, having pivot axes which are aligned with one another, and is each guided, in this example, via a respective deflection chain or sprocket wheel 8 located downline, as viewed in the processing direction, from the drive chain or sprocket wheels 7. Extending between the two conveyor chains 6' and carried thereby are gripper systems 9 provided with grippers, which move through gaps between the grippers disposed on the impression cylinder 2.1 and, in the process, accept a given sheet 3 by gripping the aforementioned gripper edge on the leading end of the sheet 3, immediately prior to the opening of the grippers disposed on the impression cylinder 2.1, and transport the sheet via a sheet guiding device 10 to a sheet brake 11, the latter grippers finally opening so as to transfer the sheet 3 to the sheet brake 11. The sheet brake imparts a reduced deposition speed to the sheets, compared with the processing speed, and then in turn releases them once this speed is reached, so that finally a respective sheet 3, now having been slowed, strikes front edge stops 12 and, being oriented at these stops and on trailing edge stops 13 opposite thereto, together with preceding and/or trailing sheets 3, forms a pile 14, that can be lowered by a lifting mechanism to an extent corresponding to the height to which the pile 14 grows. All that can be seen in FIG. 1 of the lifting mechanism is a platform 15, which supports the pile 14, and lifting chains 16 which carry the platform and are shown in phantom or dot-dash lines.

The conveyor chains 6 are guided along their path between the drive chain wheels 7, on the one hand, and the deflection chain wheels 8, on the other hand, by guide rails, which thus determine the chain paths of the runs or strands of the chain. In this embodiment, the sheets 3 are transported by the lower run of the chain, as viewed in FIG. 1. The portion of the chain path that is traversed by this lower chain run is also followed by a sheet guiding surface 17 facing towards it and formed on the sheet guiding device 10. Between the sheet guiding surface 17 and the sheet 3 being guided thereabove, a supporting air cushion is preferably formed during operation. To that end, the sheet guiding device 10 is equipped with blown air nozzles which discharge into the sheet guiding surface 17; of these nozzles only one is shown symbolically in the form of a stub 18 in FIG. 1 as representative of all of them.

To prevent the printed sheets 3 in the pile 14 from sticking together, a dryer 19 and a dust applicator 20 are provided along the path of the sheets 3 from the drive chain wheels 7 to the sheet brake 11.

To avoid excessive heating of the sheet guiding surface 17 by the dryer 19, a coolant circuit is integrated with the sheet guiding device 10; this is symbolically suggested in FIG. 1 by an inlet stub 21 and an outlet stub 22 of a coolant tub 23 associated with the sheet guiding surface 17.

The aforementioned guide rails have not been shown in FIG. 1. However, their course is apparent from the course of the chain runs in this embodiment.

Figure 2:
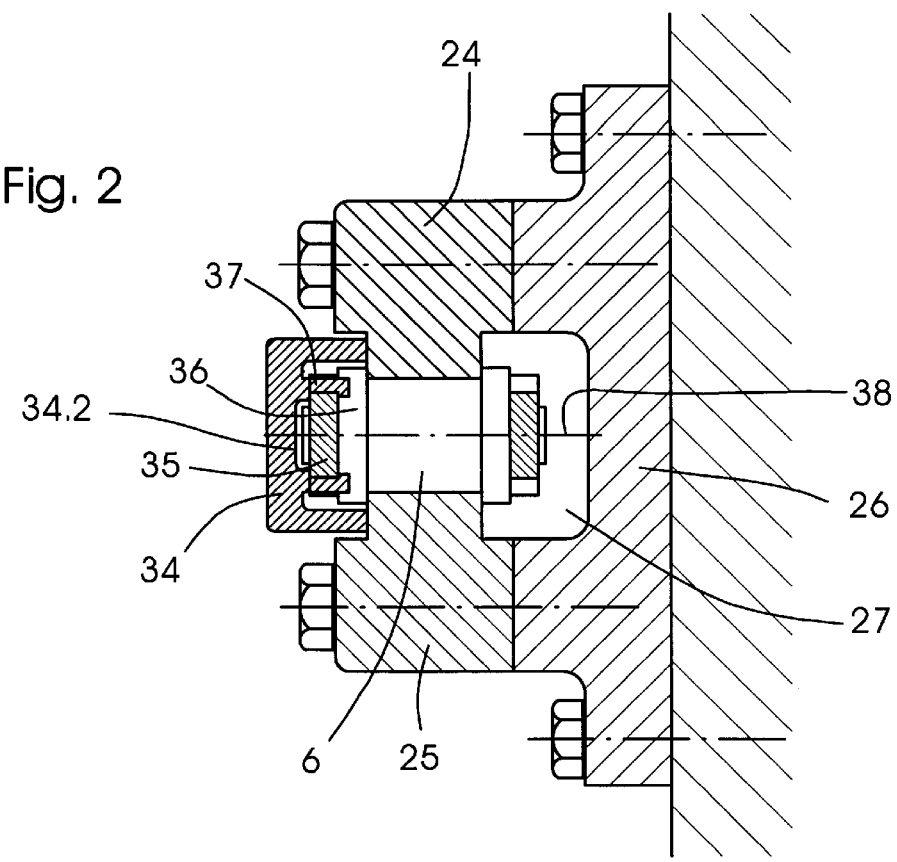
FIG. 2 is an enlarged cross-sectional view of FIG. 1 taken along the line II—II in the direction of the arrows and showing chain guide rails carried by a holder therefor, the conveyor chain being provided with cover tabs in accordance with a first exemplary embodiment.

In FIG. 2, the exemplary embodiment is shown, in a sectional view taken along the line II—II in FIG. 1, with an inner guide rail 24, an outer guide rail 25, and a holder 26 for supporting them. The guide rails 24 and 25 together with the holder 26 define a chamber 27 of approximately C-shaped cross section with an open long side 28. The physical separation shown here between the inner and outer guide rails 24 and 25 and the holder 26 is not mandatory, however.

Figure 3:
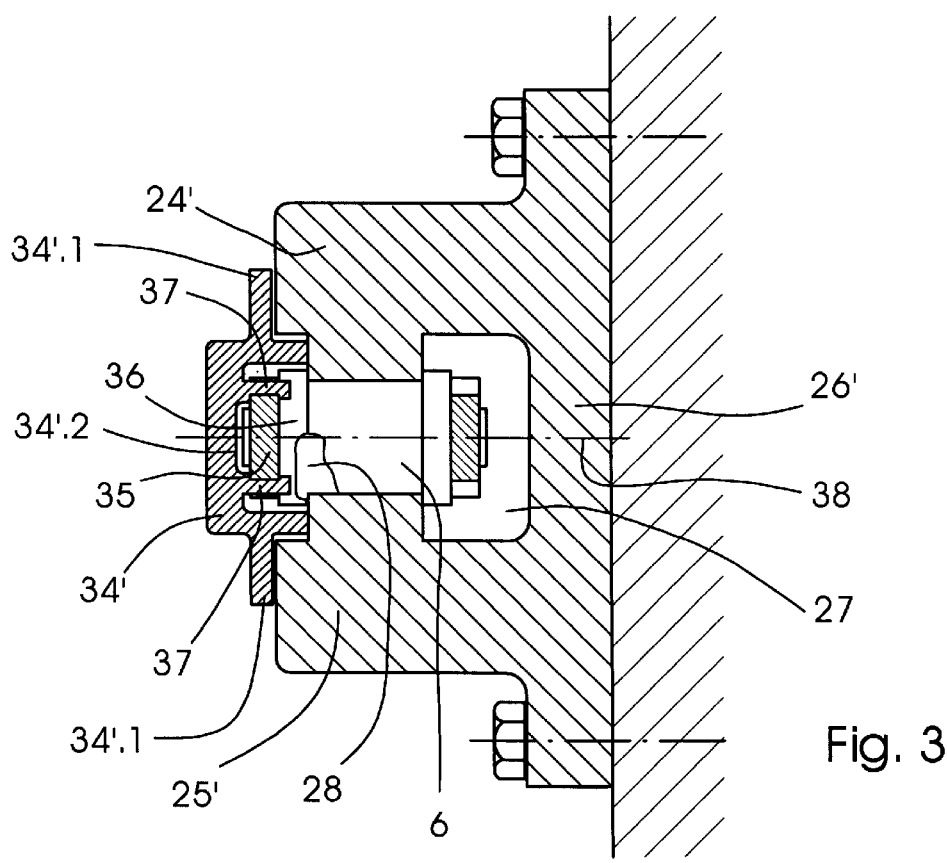
FIG. 3 is a view like that of FIG. 2, with an embodiment of the cover tabs that differs from that of FIG. 2.

As shown by way of example in FIG. 3, a unipartite component forming the guide rails 24' and 25' and a holder 26' carrying them can also be provided.

In an exemplary embodiment shown in FIG. 4, a holder 26" for an inner guide rail 24" and an outer guide rail 25" can also be formed directly by one side wall of the portion of the printing press including the chain conveyor 4, the portion in this embodiment being the chain delivery 1.

A first embodiment of a cover tab 34 can be seen in FIG. 2 in a section taken along the line II—II of FIG. 1, the cover tab 34 being shown therein in a condition wherein it is connected to a conveyor chain 6. Accordingly, and as also seen in FIGS. 3 to 5, the cover tabs 34, 34', 34" are assigned to one side of a conveyor chain 6 that is formed by outer tabs 35 and inner tabs 36 swivellably joined together with respect to articulating or pivot axes. In this example, the cover tab 34 has a substantially U-shaped cross section and is respectively provided, inside the U, with a pair of detent elements 37, which in situ engage the respective outer tab 35 from behind in the region of the narrowest cross section thereof, and thus form-lockingly connect the respective cover tab 34 to the respective outer tab 35. In this regard, it is noted that a form-locking connection is one that results from the form or shape of two connecting parts, as opposed to a forcelocking connection resulting from a force application of one connecting part to another.

A respective cover tab 34 extends along the respectively assigned outer tab 35 and protrudes past the ends thereof, with an end region graduated in such a manner that mutually opposing ends of the cover tabs 34 overlap (note FIGS. 5 and 6). The outer contours of the graduated end regions are so formed that the ends overlapping one another allow a mutual relative motion upon a deflection of the conveyor chain 6 that occurs at a specific radius of curvature.

The inside of the base of the U of the U-shaped cover tab 34 is located, in this example, on the assigned outer tab 35, and a respective leg of the U extends towards the cover tabs 34 as far as a side face of the respective guide rails 24 and 25, respectively, so that the cover tabs 34, together with the outer tabs 35 that they encompass, and with the inner tabs 36 of one side of the conveyor chain 6, cover the open long side 28 of the interior 27.

A given protective effect against the penetration of dust into the interior 27 and an escape of lubricant therefrom is already achieved if the legs of the U extend to only a few tenths of a millimeter away from the aforementioned side faces and form sealing gaps therewith.

The exemplary embodiment shown in FIG. 3 uses a cover tab 34' having an outline that is equivalent to that of the cover tab 34 in FIG. 2; but this outline is expanded here to include ribs 34.1 provided on the legs of the U, which together with side faces of the chain guide rails 24' and 25' form further sealing gaps.

If the sealing gaps formed by the legs of the U are dispensed with, then by suitable dimensioning of the chain guide rails 24' and 25', and by mounting lateral sealing strips thereon, respectively, the cross section of the cover tab can, except for the locations onto which the detent elements 37 are optionally formed, have a simple rectangular shape, by which corresponding sealing gaps can be formed, as with the ribs 34.a of the embodiment according to FIG. 3.

Due to the embodiment of the cover tab 34" shown in FIG. 5, labyrinth seal gaps can be created between the cover tab and the chain guide rails 24" and 25". To that end, compared with those of the embodiment of FIG. 2, the cover tabs 34" are modified so that the free ends of the U of the substantially U-shaped cross section of the cover tabs 34" are bent outwardly 90° and then engage in a respective longitudinal groove 24".1 and 25".1, respectively, of the respectively inner and outer chain guide rail 24" and 25", respectively.

In each case, the cover tabs 34, 34' and 34", respectively, are preferably provided with indentations 34.2, 34'.2 and 34".2, respectively, which form-lockingly engage around the protruding ends of the chain bolts. The cover tabs 34, 34' and 34", respectively, are thus connectable to the conveyor chain 6 in a positionally secured manner by the detent elements 37. The fastener that has been thus created overall ensures, on the one hand, that the shaping of the cover tabs 34, 34' and 34", respectively, and, on the other hand, the mounting or assembly thereof on a standardized roller chain, are very simple.

We claim:

1. A chain conveyor for transporting sheets in a sheet-processing printing press, having chain guide rails which, together with a holder for carrying the guide rails, define an interior having an open long side, and having conveyor chains carrying gripper systems for gripping the sheets, the conveyor chains being guidable by the chain guide rails, being formed by outer tabs and inner tabs joined together swivellably with respect to pivot axes and, on a side thereof, having cover tabs for covering the open long side, comprising detent elements on the cover tabs for connecting the cover tabs form-lockingly to a respective outer tab.

2. The chain conveyor according to claim 1, wherein said detent elements engage behind the respective outer tab in the region of the narrowest cross section thereof.

3. The chain conveyor according to claim 1, wherein a respective cover tab, on a side thereof facing towards a respective outer tab, is formed with indentations which are concentric to the respective pivot axis.

4. A sheet-fed printing press having a chain conveyor for transporting sheets, the chain conveyor having chain guide rails which, together with a holder for carrying the guide rails, define an interior having an open long side, and having conveyor chains carrying gripper systems for gripping the sheets, the conveyor chains being guidable by the chain guide rails, being formed by outer tabs and inner tabs joined together swivellably with respect to pivot axes and, on a side thereof, having cover tabs for covering the open long side, comprising detent elements on the cover tabs for connecting the cover tabs form-lockingly to a respective outer tab.

* * * * *